United States Patent
Landre et al.

(10) Patent No.: US 12,499,720 B2
(45) Date of Patent: Dec. 16, 2025

(54) SAFETY MODULE FOR AN INVERTER OF A HYBRID VEHICLE

(71) Applicant: Vitesco Technologies GmbH, Regensburg (DE)

(72) Inventors: Frédéric Landre, Toulouse (FR); Julien Mouret, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 59 days.

(21) Appl. No.: 18/697,549

(22) PCT Filed: Oct. 5, 2022

(86) PCT No.: PCT/EP2022/077629
§ 371 (c)(1),
(2) Date: Apr. 1, 2024

(87) PCT Pub. No.: WO2023/016814
PCT Pub. Date: Apr. 20, 2023

(65) Prior Publication Data
US 2024/0412571 A1  Dec. 12, 2024

(30) Foreign Application Priority Data
Oct. 13, 2021  (FR) ..................... 2110821

(51) Int. Cl.
*G07C 5/08*  (2006.01)
*G01R 19/14*  (2006.01)
(Continued)

(52) U.S. Cl.
CPC .......... *G07C 5/0808* (2013.01); *G01R 19/14* (2013.01); *G01R 31/3277* (2013.01);
(Continued)

(58) Field of Classification Search
CPC .. G07C 5/0808; G07C 5/0825; G07C 5/0833; G07C 5/10; G01R 19/14; G01R 31/3277; H02P 27/06; H02P 29/024
See application file for complete search history.

(56) References Cited

U.S. PATENT DOCUMENTS 10,516,332 B2 * 12/2019 Yukutake ............. H02P 29/032
2007/0291426 A1   12/2007 Kasunich et al.
2021/0184457 A1 *  6/2021 Tanouchi ........... H02P 29/0241

FOREIGN PATENT DOCUMENTS

DE  10 2012 021 161 A1  4/2014
EP    3 499 704 A1     6/2019

OTHER PUBLICATIONS

Notification of Transmittal of the International Search Report (Forms PCT/ISA/220 and PCT/ISA/210) and the Written Opinion of the International Searching Authority (Form PCT/ISA/237) issued Jan. 4, 2023, by the European Patent Office in corresponding International Application No. PCT/EP2022/077629. (11 pages).

* cited by examiner

*Primary Examiner* — Aryan E Weisenfeld
(74) *Attorney, Agent, or Firm* — Buchanan Ingersoll & Rooney PC

(57) ABSTRACT

A safety module for an inverter of a motor vehicle. The inverter including at least two power circuits. The safety module including a control unit and at least two safety switches, each safety switch being associated with a power circuit and being connected between the power circuit and a point referred to as the "measurement" point. The control unit being capable of controlling each safety switch and being configured to detect a closing malfunction of a safety switch if: a) a closing command has been sent to the safety switch, the other safety switches being open, b) and the voltage at the measurement point is negative.

15 Claims, 2 Drawing Sheets

(51) Int. Cl.
*G01R 31/327* (2006.01)
*G07C 5/10* (2006.01)
*H02P 27/06* (2006.01)
*H02P 29/024* (2016.01)
(52) U.S. Cl.
CPC ......... *G07C 5/0825* (2013.01); *G07C 5/0833* (2013.01); *G07C 5/10* (2013.01); *H02P 27/06* (2013.01); *H02P 29/024* (2013.01)

[Fig 1]
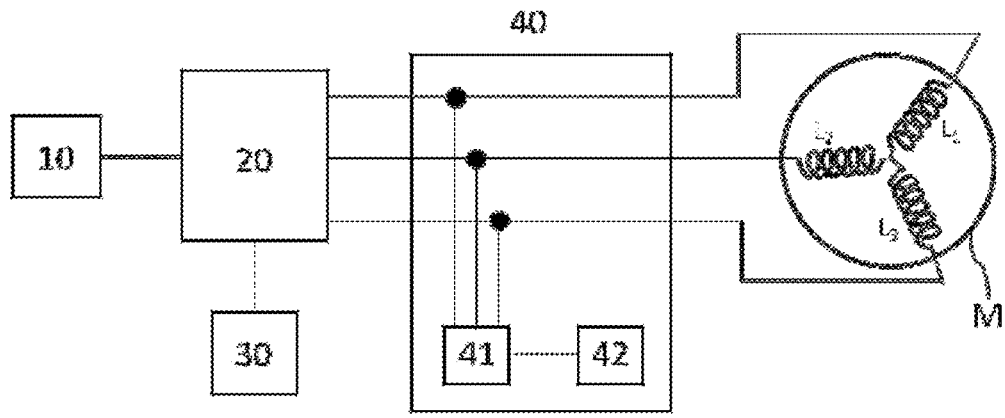
[Fig 2]
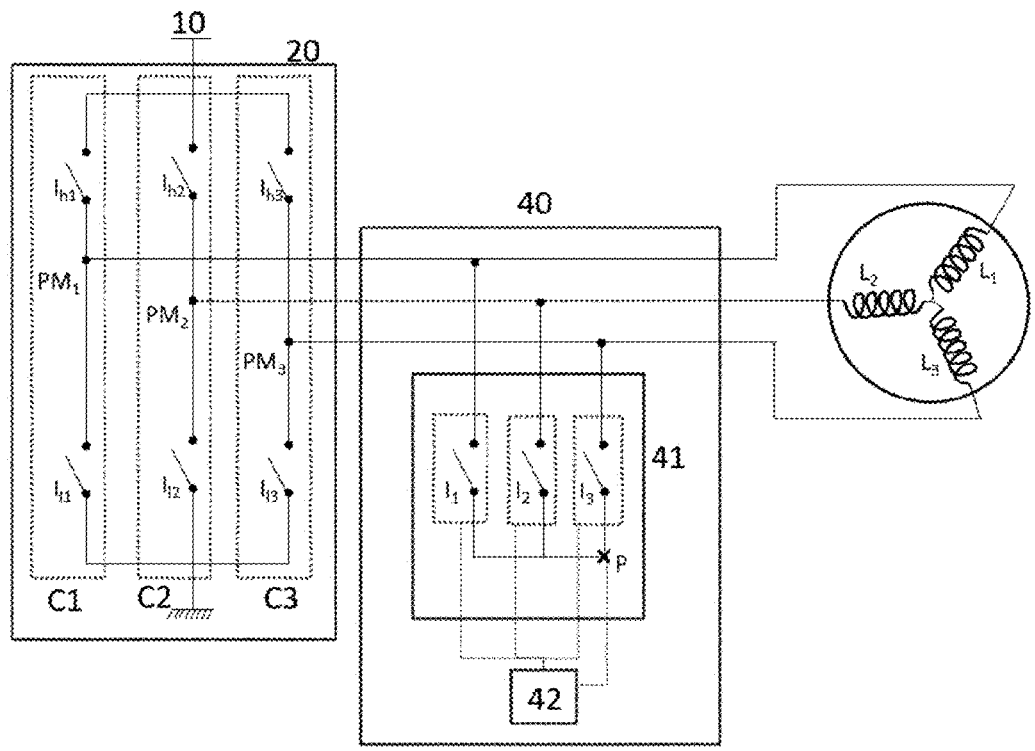

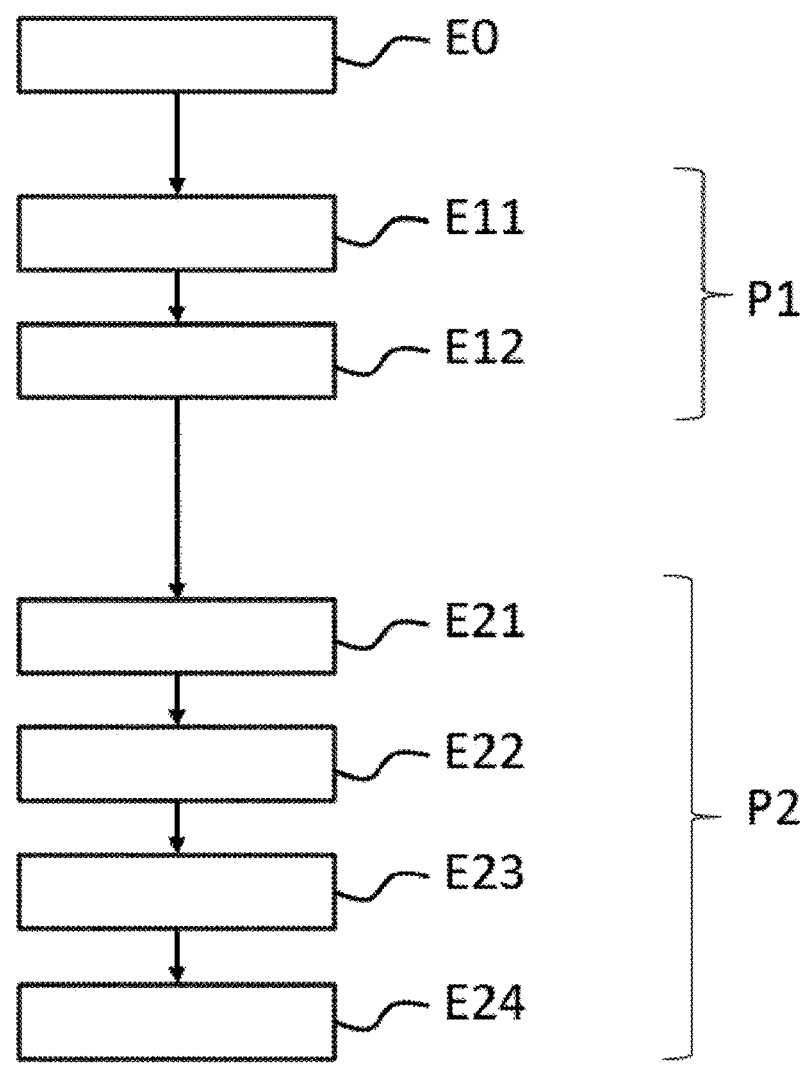
[Fig 3]

SAFETY MODULE FOR AN INVERTER OF A HYBRID VEHICLE

CROSS REFERENCE TO RELATED APPLICATIONS

This application is the U.S. National Phase Application of PCT International Application No. PCT/EP2022/077629, filed Oct. 5, 2022, which claims priority to French Application No. 2110821, filed Oct. 13, 2021, the contents of such applications being incorporated by reference herein.

FIELD OF THE INVENTION

The invention relates to the field of hybrid vehicles and more specifically to a safety module for an inverter of a hybrid or electric vehicle.

BACKGROUND OF THE INVENTION

In a known manner, such a vehicle comprises a combustion engine, a battery and an electric machine. The electric machine is able to operate in two operating modes: a motor operating mode, in which the electric machine converts electric energy delivered by the battery into mechanical energy in order to start the combustion engine, and a generator operating mode, in which the electric machine converts the mechanical energy for running the combustion engine into electric energy stored in the battery.

Notably, the electric machine and the battery may be used to supply electric energy to the electric network of the vehicle in order to supply DC voltage to various pieces of equipment in the vehicle.

In the case of a three-phase electric machine, the electric machine comprises three coils.

To control the electric machine, an inverter is connected between the battery and the electric machine. In the present case, the inverter can generate three different currents, phase shifted relative to each other, from the voltage delivered by the battery. Each generated current may be used to supply one coil of the electric machine.

To generate the three alternating currents, the inverter comprises three power levels. Each power level comprises a first MOSFET transistor, referred to as "high" because its drain is connected to the battery, and a second MOSFET transistor, referred to as "low" because its source is connected to ground. The drain of the low transistor is connected to the source of the high transistor. The current for supplying the corresponding coil of the electric machine is generated at the midpoint connecting the two transistors.

Additionally, a control unit can control each transistor of the inverter in order to modify the phase or amplitude of the current generated at each midpoint.

When the electric machine operates in generator mode, electric energy flows from the electric machine toward the battery to recharge the battery. However, when the battery is fully charged, if the inverter malfunctions, the current may continue to flow from the electric machine to the battery, which may cause overcharging of the battery and consequent damage to the battery. A protection module is therefore fitted in the vehicle, to protect the battery if a malfunction is detected.

In a known manner, the protection module comprises three protection transistors, each protection transistor being connected to its own midpoint. The protection module is also controlled by the control unit. If a malfunction is detected in a high or low transistor, the control unit commands the protection transistors to connect the midpoints to each other, thus preventing the current from flowing to the battery.

However, it is also necessary to perform a diagnosis on the protection module, and more precisely on each protection transistor. For this purpose, it is known to measure the current in each branch connecting each safety transistor to the corresponding midpoint. Thus the control unit can check whether the variation of current in each of the branches corresponds to the command sent to each protection transistor. In the contrary case, the control unit detects a malfunction of a protection transistor. In this solution, it is therefore necessary to install a plurality of current measurement devices, which is restrictive, troublesome and costly in terms of components and assembly.

Consequently there is a need for a solution that enables at least some of the aforementioned drawbacks to be overcome.

SUMMARY OF THE INVENTION

To this end, an aspect of the invention relates to a safety module for an inverter of a motor vehicle, the vehicle comprising a battery, the inverter comprising at least two power circuits, each power circuit comprising a first switch referred to as "high", connected between the battery and a midpoint belonging to said power circuit, and a second switch referred to as "low", connected between the midpoint and a ground, each power circuit being capable of delivering an alternating current at its midpoint, the safety module comprising a control unit and at least two safety switches, each safety switch being associated with a power circuit and being connected between the midpoint of the power circuit with which it is associated and a point referred to as the "measurement" point, the measurement point being common to the safety switches, the control unit being capable of controlling each safety switch and being remarkable in that it is configured to measure the voltage at the measurement point and to detect a closing malfunction of a safety switch if:

a) a closing command has been sent to said safety switch, the other safety switches being open, b) and the voltage at the measurement point is negative.

Thus the control unit of the safety module makes it possible to check the operating state of the closure of a safety switch, using only one measurement point and on the basis of a single measured value of voltage. It is simpler to fit a voltage measurement device common to all the safety switches than to fit a current measurement device for each safety switch. Moreover, it is less expensive to fit a single voltage measurement device than to fit a plurality of current measurement devices. Finally, the control unit may be used to determine in real time whether a safety switch is exhibiting a closing malfunction.

Preferably, the control unit is configured to determine a time interval in which all the high switches or all the low switches are closed, the control unit being capable of detecting a closing malfunction of a safety switch during the determined time interval.

Thus the control unit is capable of determining a time interval during which the diagnosis can be performed on the safety switches, without interfering with the normal operation of the inverter.

Preferably, the safety switches are transistors, preferably of the MOSFET or bipolar type. Since each transistor has an intrinsic capacitance, for example between the source and the drain for a MOSFET transistor, there is no need to add a supplementary capacitor at the terminals of the switch.

According to another embodiment, in the case where none of the transistors has an intrinsic capacitance, an external capacitor is added in parallel with each transistor.

Also preferably, the control unit is capable of detecting an opening malfunction of a safety switch if a short circuit is detected between two of the midpoints.

Thus the control unit of the safety module makes it possible to detect both a closing malfunction and an opening malfunction of a safety switch.

An aspect of the invention also relates to a motor vehicle comprising a battery and an inverter, the inverter comprising at least two power circuits, each power circuit comprising a first switch, referred to as "high", connected between the battery and a motor vehicle belonging to said power circuit, and a second switch, referred to as "low", connected between the midpoint and a ground, each power circuit being capable of delivering an alternating current at its midpoint, the vehicle being remarkable in that it comprises a safety module as described above.

An aspect of the invention also relates to a diagnostic method for a motor vehicle as described above, the method being implemented by the control unit and comprising a phase of checking the operation of the closing of a safety switch, comprising the steps of:
a) sending a closing command to a safety switch, the other switches being open,
b) measuring the voltage at the measurement point, following the step of sending a closing command,
c) detecting a closing malfunction of the safety switch that has received the closing command, if the measured voltage is strictly negative.

Thus the method may be used to detect in real time whether one of the safety switches is faulty and no longer capable of closing correctly, using only one measurement point and on the basis of a single value of voltage.

Preferably, the phase of checking the operation of the closing of a safety switch is reiterated for each safety switch.

Thus the method may be used to detect in real time whether one of the safety switches is faulty and no longer capable of closing correctly, by using only one measurement point and on the basis of a single value of voltage.

Also preferably, the method comprises, before the checking phase, a preliminary step of determining the time interval within which the diagnosis is to be performed on the safety switches, corresponding to a time interval in which all the high switches, or low switches, are open.

Thus the control unit is capable of determining a time interval during which the diagnosis can be performed on the safety switches, without interfering with the normal operation of the inverter.

Advantageously, the method comprises, after each detection step, a step of warning of the detection of a malfunction in a safety switch, via an indicator light displayed on the instrument panel of the vehicle, or via an audible signal. Thus the vehicle user is warned of the malfunction and of the need to replace one or more of the safety switches.

An aspect of the invention also concerns a computer program which is noteworthy in that it comprises a set of program code instructions which, when they are executed by one or more processors, configure the one or more processors to implement a method as was presented above.

BRIEF DESCRIPTION OF THE DRAWINGS

Other features, aspects, and advantages of the invention will become more apparent upon reading the following description. This description is purely illustrative and should be read with reference to the appended drawings, in which:

FIG. 1 is a schematic view of an assembly comprising a battery, an inverter, an electric machine and a safety module according to an aspect of the invention.

FIG. 2 is a detailed view of part of the inverter, the safety module and the electric machine according to FIG. 1.

FIG. 3 is a schematic representation of the method according to an aspect of the invention.

DETAILED DESCRIPTION OF THE PREFERRED EMBODIMENTS

Vehicle

An embodiment of the vehicle according to the invention will now be described. With reference to FIG. 1, the vehicle is a hybrid vehicle, and accordingly it comprises a combustion engine, a battery 10, an electric machine M, an inverter 20, a controller 30 of the inverter 20, and a safety module 40.

The battery 10 is capable of delivering a DC voltage to supply electric energy to various pieces of equipment fitted to the vehicle. In the present case, the battery is, notably, capable of supplying power to the electric machine M.

The electric machine M denotes, notably, a permanent magnet electric motor, or "alternator-starter" or "belt starter generator", as it is more commonly called by those skilled in the art.

The electric machine M is able to operate in two operating modes: a drive mode in which the electric machine M converts electric energy into mechanical energy in order to start the combustion engine, and a generator mode in which the electric machine M converts the mechanical energy from rotation of the combustion engine into electric energy stored in the battery 10.

An electric machine M usually has at least two phases and a number of coils equal to the number of phases. In the example described below, the electric machine M is three-phase and comprises three coils L1, L2, L3.

The inverter 20 is connected between the battery 10 and the electric machine M in order to control the electric machine M.

The inverter 20 is capable of generating at least one alternating current from the voltage delivered by the battery 10. Each alternating current generated by the inverter 20 may be used to supply one coil L1, L2, L3 of the electric machine M. Thus, since the electric machine M comprises three coils L1, L2, L3, the inverter 20 is capable of generating three alternating currents, phase-shifted relative to each other.

The controller 30 can command the inverter 20 to define the conversion of the voltage between the battery 10 and the electric machine M.

The safety module 40 comprises a set 41 of switches referred to as "safety" switches, and a control unit 42.

With reference to FIG. 2, the detailed structure of the inverter 20 and of the safety module 40 is shown here.

To generate each alternating current, the inverter 20 comprises what is referred to as a "power" circuit. According to the example described here, the inverter 20 is capable of generating three phase-shifted alternating currents to supply the electric machine M, and the inverter 20 therefore comprises three power circuits C1, C2, C3.

Each power circuit C1, C2, C3 comprises a first switch referred to as "high" $I_{h1}, I_{h2}, I_{h3}$ and a second switch referred to as "low" $I_{l1}, I_{l2}, I_{l3}$.

The first switch $I_{h1}$, $I_{h2}$, $I_{h3}$ of each power circuit C1, C2, C3 is connected between the battery 10 and a midpoint PM1, PM2, PM3 belonging to said power circuit C1, C2, C3.

The second switch $I_{l1}$, $I_{l2}$, $I_{l3}$ of each power circuit C1, C2, C3 is connected between the midpoint PM1, PM2, PM3 belonging to said power circuit C1, C2, C3 and a ground.

Thus, for each power circuit C1, C2, C3, the first switch $I_{h1}$, $I_{h2}$, $I_{h3}$ and the second switch $I_{l1}$, $I_{l2}$, $I_{l3}$ are connected to each other via the midpoint belonging to said power circuit C1, C2, C3.

Each power circuit C1, C2, C3 thus generates an alternating current at its midpoint PM1, PM2, PM3.

Thus the midpoint PM1 of the first power circuit C1 is connected to the first coil L1 of the electric machine M, the second midpoint PM2 of the second power circuit C2 is connected to the second coil L2, and the third midpoint PM3 of the third power circuit C3 is connected to the third coil L3.

Preferably, each switch is a transistor, of the MOSFET or bipolar type for example. According to the example described, the switches are of the MOSFET type.

According to a first embodiment, each switch has an intrinsic capacitance, which is, for example, connected between the source and the drain for a MOSFET transistor. Thus there is no need to add a supplementary capacitor at the terminals of the switch.

According to another embodiment, in the case where none of the switches has an intrinsic capacitance, an external capacitor is added in parallel with each switch.

The controller 30 of the inverter 20 can command the opening and closing of each high switch $I_{h1}$, $I_{h2}$, $I_{h3}$ and each low switch $I_{l1}$, $I_{l2}$, $I_{l3}$, according to the amplitude and frequency of the alternating currents to be delivered.

More precisely, again with reference to FIG. 2, the set 41 comprises as many safety switches as there are power circuits C1, C2, C3. Each safety switch I1, I2, I3 of the set 41 is associated with a power circuit C1, C2, C3. For example, the first safety switch I1 is associated with the first power circuit C1, and is connected between the midpoint PM1 of the first power circuit C1 and a point referred to as the "measurement" point P. Similarly, the second safety switch I2 is associated with the second power circuit C2 and is connected between the midpoint PM2 of the second power circuit C2 and the measurement point P. Finally, the third safety switch I3 is associated with the third power circuit C3 and is connected between the midpoint PM3 of the third power circuit C3 and the measurement point P. The measurement point P is therefore common to all the safety switches I1, I2, I3.

The control unit 42 is connected to each safety switch I1, I2, I3.

The control unit 42 can command the opening or closing of each safety switch I1, I2, I3 simultaneously or independently. By default, if no malfunction is detected in a high switch $I_{h1}$, $I_{h2}$, $I_{h3}$ or a low switch $I_{l1}$, $I_{l2}$, $I_{l3}$, the safety switches I1, I2, I3 are opened. For example, before the starting of the electric machine M, the control unit 42 is configured to send an opening command to the safety switches I1, I2, I3.

Conversely, if a malfunction is detected in a high switch $I_{h1}$, $I_{h2}$, $I_{h3}$ or a low switch $I_{l1}$, $I_{l2}$, $I_{l3}$, the control unit 42 is configured to send a closing command to the safety switches I1, I2, I3, so that the current flowing in the coils L1, L2, L3 is directed toward the safety switches I1, I2, I3 and not toward the battery 10, in order to avoid any damage to the battery 10.

Additionally, the control unit 42 can determine, in real time, a time interval in which all the high switches $I_{h1}$, $I_{h2}$, $I_{h3}$, or the low switches $I_{l1}$, $I_{l2}$, $I_{l3}$, are closed. For this purpose, the control unit 42 can communicate with the controller 30 of the inverter 20, and can therefore know at what instant the control unit 30 has sent a closing command to all the high switches $I_{h1}$, $I_{h2}$, $I_{h3}$ or all the low switches $I_{l1}$, $I_{l2}$, $I_{l3}$.

The control unit 42 is connected to the measurement point P. The control unit 42 can measure the voltage at the measurement point P.

The control unit 42 can also check the operation of the safety switches I1, I2, I3 at regular intervals.

According to a first embodiment, the control unit 42 can detect an opening malfunction of a safety switch I1, I2, I3 if a short circuit is detected between two of the midpoints PM1, PM2, PM3.

According to another embodiment, the control unit 42 can detect an opening malfunction of a safety switch I1, I2, I3 if:
 a. an opening command has been sent to all the safety switches I1, I2, I3,
 b. the voltage at the measurement point P is not negative.

The control unit 42 can also detect an closing malfunction of a safety switch I1, I2, I3 if:
 a. a closing command has been sent to said safety switch (I1, I2, I3), the other safety switches being open,
 b. the voltage at the measurement point (P) is negative.

The control unit 42 comprises a processor capable of implementing a set of instructions making it possible to execute these functions.

Method

A description will now be given of an embodiment of the method for diagnosing the safety switches I1, I2, I3 of the safety module 40 according to an aspect of the invention, with reference to FIG. 3.

Before the method is executed, all the safety switches I1, I2, I3 are open. The electric machine M is operating in motor mode or generator mode.

Firstly, the method comprises a preliminary step E0 of determining the time interval within which the diagnosis of the safety switches I1, I2, I3 is to be performed. For this purpose, the control unit 42 receives the closing commands sent by the controller 30 of the inverter 20 to the high switches $I_{h1}$, $I_{h2}$, $I_{h3}$ and to the low switches $I_{l1}$, $I_{l2}$, $I_{l3}$. The control unit 42 can thus determine, in real time, a time interval in which all the high switches $I_{h1}$, $I_{h2}$, $I_{h3}$, or the low switches $I_{l1}$, $I_{l2}$, $I_{l3}$, are closed.

The method comprises a first phase P1 of periodic checking of the operation of the opening of the safety switches I1, I2, I3.

According to a first embodiment, the first phase P1 comprises a step of detecting an opening malfunction in a safety switch I1, I2, I3 if a short circuit is detected between two of the midpoints PM1, PM2, PM3.

According to a second embodiment, the first phase P1 comprises a step E11 of sending an opening command to all the safety switches I1, I2, I3 via the control unit 42. Each safety switch I1, I2, I3 therefore receives the opening command. Each safety switch I1, I2, I3 must therefore open.

Again according to the second embodiment, the first phase P1 also comprises a step E12 of confirming the correct operation of the safety switches I1, I2, I3 if the voltage at the measurement point P is negative. The sending step E11 and confirmation step E12 are repeated periodically.

After the first phase P1, and within the time interval determined in the preliminary step E0, the method comprises a second phase P2 of checking the operation of the closing of each safety switch I1, I2, I3.

The second phase P2 comprises a step of sending a closing command E21 to only one safety switch I1, I2, I3 out of the three safety switches I1, I2, I3. The safety switch I1 or I2 or I3 concerned therefore receives the closing command and should close as requested by the command.

The second phase P2 then comprises a step E22 of measuring the voltage at the measurement point P, following the step of sending a closing command E21. For this purpose, the control unit 42 measures the voltage at the measurement point P.

The method then comprises a step of detecting a closing malfunction E23 of the safety switch I1, I2, I3 that has received the closing command, if the measured voltage is strictly negative. This means that the safety switch I1, I2, I3 is acting as an open switch instead of a closed switch.

Conversely, if the measured voltage is substantially zero, this means that the switch that has received the closing command has closed correctly.

Thus the sending step E21, the measurement step E22 and the step E23 of detecting a closing malfunction are repeated for each of the safety switches I1, I2, I3.

Thus the method makes it possible to detect whether there is a malfunction in each safety switch I1, I2, I3, and to determine if this corresponds to a closing fault or an opening fault of the safety switch I1, I2, I3.

The second phase of the method may also comprise a step E24 of warning of the detection of a malfunction in a safety switch I1, I2, I3, for example via an indicator light displayed on the instrument panel of the vehicle, or via an audible signal. The user thus knows that it is necessary to replace the safety module 40, or at least the safety switches 42.

The invention claimed is:

1. A safety module for an inverter of a motor vehicle, the vehicle comprising a battery, the inverter comprising at least two power circuits, each power circuit comprising a first switch referred to as "high", connected between the battery and a midpoint belonging to said power circuit, and a second switch referred to as "low", connected between the midpoint and a ground, each power circuit being capable of delivering an alternating current at its midpoint, the safety module comprising a control unit and at least two safety switches, each safety switch being associated with a power circuit and being connected between the midpoint of the power circuit with which it is associated and a point referred to as the "measurement" point, the measurement point being common to the safety switches, the control unit being capable of controlling each safety switch and being configured to measure the voltage at the measurement point and to detect a closing malfunction of a safety switch if:
   a) a closing command has been sent to said safety switch, the other safety switches being open,
   b) and the voltage at the measurement point is negative.

2. The safety module as claimed in claim 1, wherein the control unit is configured to determine a time interval in which all the high switches or all the low switches are closed, the control unit being capable of detecting a closing malfunction of a safety switch during the determined time interval.

3. The safety module as claimed in claim 1, wherein the safety switches are transistors.

4. The safety module as claimed in claim 1, wherein the control unit can detect an opening malfunction of a safety switch I1, I2, I3 if a short circuit is detected between two of the midpoints.

5. A motor vehicle, comprising a battery and an inverter, the inverter comprising at least two power circuits, each power circuit comprising a first switch, referred to as "high", connected between the battery and a midpoint belonging to said power circuit, and a second switch, referred to as "low", connected between the midpoint and a ground, each power circuit being capable of delivering an alternating current at its midpoint, the vehicle comprising a safety module as claimed in claim 1.

6. A diagnostic method for a motor vehicle as claimed in claim 5, the method being implemented by the control unit and comprising a phase of checking the operation of the closing of a safety switch, the method comprising:
   a) sending a closing command to a safety switch, the other switches being open,
   b) measuring the voltage at the measurement point, following the step of sending a closing command, and
   c) detecting a closing malfunction of the safety switch that has received the closing command, if the measured voltage is strictly negative.

7. The method as claimed in claim 6, wherein the phase of checking the operation of the closing of a safety switch is reiterated for each safety switch.

8. The method as claimed in claim 6, comprising, before the checking phase, a preliminary step of determining the time interval in which the diagnosis of the safety switches is to be performed, corresponding to a time interval in which all the high switches, or the low switches, are closed.

9. The method as claimed in claim 6, comprising, after each detection step, a step of warning of the detection of a malfunction in a safety switch, via an indicator light displayed on the instrument panel of the vehicle, or via an audible signal.

10. A computer program product, comprising a set of program-code instructions that, when they are executed by one or more processors, configure the processor or processors to implement a method as claimed in claim 6.

11. The safety module as claimed in claim 3, wherein the transistors are MOSFET transistors or bipolar transistors.

12. The method as claimed in claim 7, comprising, before the checking phase, a preliminary step of determining the time interval in which the diagnosis of the safety switches is to be performed, corresponding to a time interval in which all the high switches, or the low switches, are closed.

13. The method as claimed in claim 12, comprising, after each detection step, a step of warning of the detection of a malfunction in a safety switch, via an indicator light displayed on the instrument panel of the vehicle, or via an audible signal.

14. The method as claimed in claim 7, comprising, after each detection step, a step of warning of the detection of a malfunction in a safety switch, via an indicator light displayed on the instrument panel of the vehicle, or via an audible signal.

15. The method as claimed in claim 8, comprising, after each detection step, a step of warning of the detection of a malfunction in a safety switch, via an indicator light displayed on the instrument panel of the vehicle, or via an audible signal.

* * * * *